Sept. 16, 1958 R. N. THURSTON 2,852,595
APPARATUS FOR ELIMINATING MECHANICAL
VIBRATIONS IN AERIAL CABLES
Filed Feb. 26, 1954 3 Sheets-Sheet 1

INVENTOR
R. N. THURSTON
BY
ATTORNEY

Sept. 16, 1958 R. N. THURSTON 2,852,595
APPARATUS FOR ELIMINATING MECHANICAL
VIBRATIONS IN AERIAL CABLES
Filed Feb. 26, 1954 3 Sheets-Sheet 2

INVENTOR
R. N. THURSTON
BY
H. O. Wright
ATTORNEY

Sept. 16, 1958 R. N. THURSTON 2,852,595
APPARATUS FOR ELIMINATING MECHANICAL
VIBRATIONS IN AERIAL CABLES
Filed Feb. 26, 1954 3 Sheets-Sheet 3

INVENTOR
R. N. THURSTON
BY
H. O. Wright
ATTORNEY

United States Patent Office 2,852,595
Patented Sept. 16, 1958

2,852,595

APPARATUS FOR ELIMINATING MECHANICAL VIBRATIONS IN AERIAL CABLES

Robert N. Thurston, Whippany, N. J., assignor to Bell Telephone Laboratories, Incorporated, New York, N. Y., a corporation of New York Application February 26, 1954, Serial No. 412,888

2 Claims. (Cl. 174—42)

This invention relates to multispan aerial cable systems in which the cable is suspended at substantially regular, widely spaced, intervals. More particularly, it relates to methods and apparatus for supporting the cable spans so that injury to the cable from "dancing," or low frequency vertical vibration, induced by wind pressures in long cable spans is substantially eliminated. The generic concepts upon which structures of the present invention are based are disclosed and claimed in the copending application of W. P. Mason, Serial No. 412,770, filed February 26, 1954, concurrently with the present application and assigned to applicant's assignee. The structures disclosed in the present application avoid certain limitations and difficulties which arise in connection with the structures of the above-mentioned application of W. P. Mason and therefore can be considered as improved devices of the general type disclosed in said Mason application.

Accordingly, a principal object of the arrangements of the present application is to eliminate the harmful effects of cable "dancing," or low frequency vertical vibration of the cable spans, in a long multispan aerial cable system.

A further object is to provide improved cable supporting arrangements which will effect the above stated principal object.

Other and further objects will become apparent during the course of the detailed description of specific illustrative embodiments given hereinunder and from the appended claims.

The phenomenon of cable "dancing" in the spans of an aerial cable system is discussed in the above-mentioned application of W. P. Mason and several cable supporting structures which constitute mechanical, band-pass, wave filters adapted to mechanically interconnect the adjacent ends of successive cable spans in an aerial cable system are disclosed and theoretically analyzed in said application. In general the present application is directed to improved forms of such structures to which substantially the same theoretical analysis is directly applicable, as will be apparent to those skilled in the art.

The principles, objects and features of the present invention will become readily apparent from the detailed description of illustrative structures given hereinunder and shown in the accompanying drawings, in which.

Figure 1:
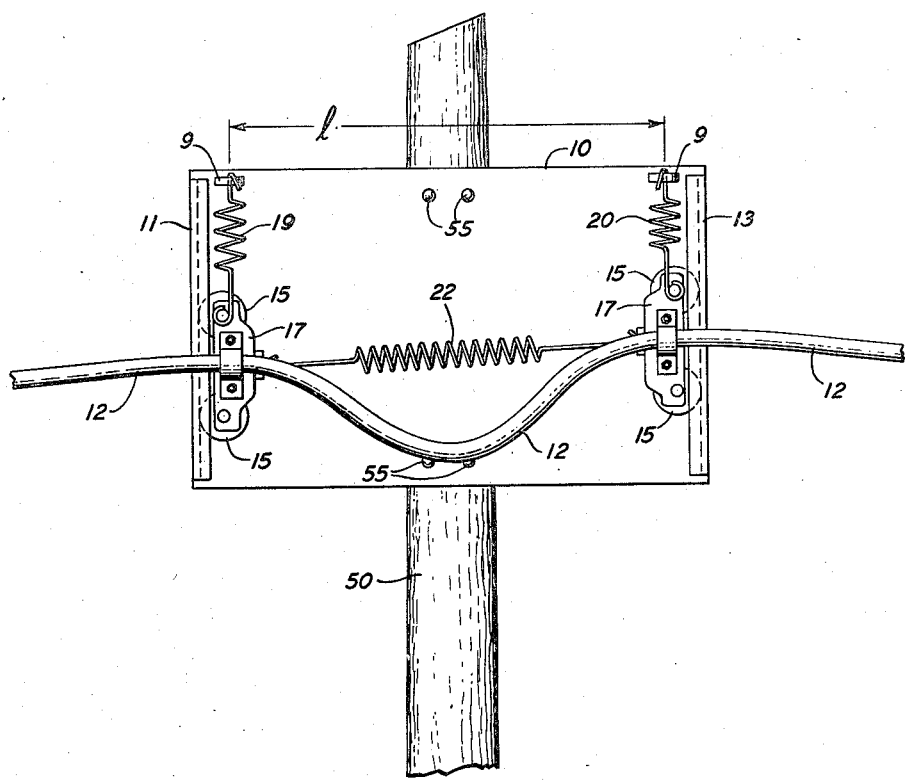
Fig. 1 is a first form of cable supporting, mechanical, band-pass, wave filter of the invention.

In more detail in Fig. 1, a rigid frame 10 is affixed by lag-screws 55 to an interspan supporting pole 50 of a multispan aerial cable system. Frame 10 serves as a mounting for the cable-supporting mechanical band-pass wave filter comprising springs 19, 20 and 22 and the two masses 17. The masses 17 are in the form of "carriages," each having four wheels 15. The carriages 17 are adapted to securely hold the cable 12 centrally between the wheels 15 and to permit vertical movement along the adjacent sides 11 and 13 of frame 10, respectively, as shown. Sides 11 and 13 act as vertical tracks for the wheels 15 of carriages 17 so that the tension of the span to the left of frame 10 is sustained by the left side 11 and that of the span to the right of frame 10 is sustained by the right side 13 of frame 10. Slots of suitable dimensions are, of course, provided in the sides 11 and 13 of frame 10, respectively, to permit the ends of the spans of cable 12 to move vertically.

Figure 3:
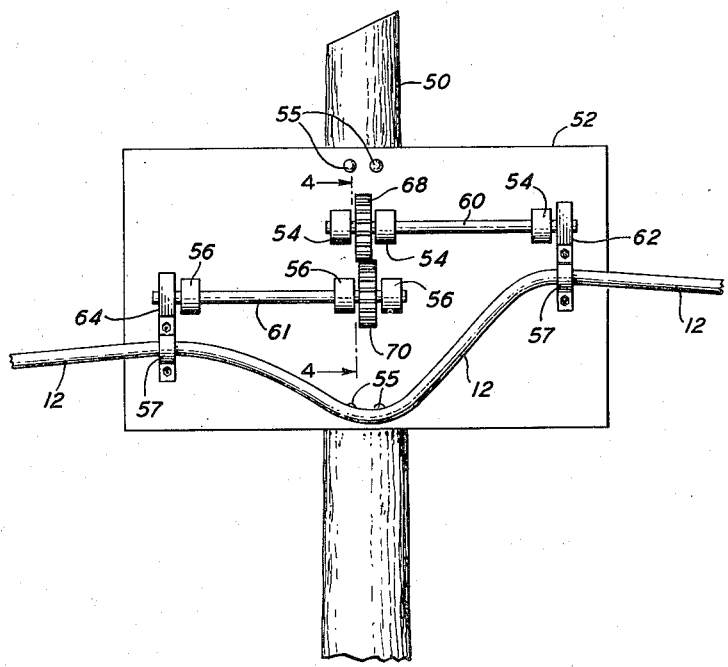
Fig. 3 is an improved form of mechanical band-pass wave filter particularly well adapted for supporting the adjacent ends of consecutive spans of an aerial cable system.

The arrangement shown is, obviously, similar to that shown in Fig. 3 of the drawings accompanying the above-mentioned application of W. P. Mason. It differs therefrom principally in the provision of the fixed frame 10 and the coupling spring 22. In the arrangement of Fig. 1 of the drawings of the present application, being described, the length of cable between the left and the right carriages 17 can be a loop under substantially no tension, since, as just described above, the tension of the left and right cable spans is sustained by the left and right vertical walls, 11, 13, respectively, of frame 10. The left carriage or mass 17 is also supported vertically by spring 19, the upper end of which spring is attached by a bracket 9 (left) to the upper portion of frame 10, as shown. The right carriage or mass 17 is likewise supported vertically by spring 20, the upper end of which spring is likewise attached by a bracket 9 (right) to the upper portion of frame 10, as shown. Spring 22 affords an appropriate coupling compliance between the left and right carriages or masses 17. The distance $l$ between the points of support at the upper ends of springs 19 and 20, respectively, can be selected solely by considerations of mechanical convenience to accommodate a coupling spring 22 of suitable compliance and to afford sufficient space in view of the type of cable being supported to also accommodate a tensionless loop of cable between the carriages 17 under all operating conditions likely to be encountered.

In computing the suitable values for the masses 17 one half the weight of the loop of cable 12 between them, and the weight of the four wheels 15 of each carriage are, of course, included as part of each carriage. If the wheels are of appreciable size and weight their rotational inertia must also be taken into account.

As demonstrated in the above-mentioned application of W. P. Mason, the combination of two like masses 17, suspended on two like springs 19 and 20, respectively, the masses being coupled by a compliance, spring 22, can be readily proportioned and arranged to constitute a mechanical band-pass wave filter analogous to an electrical band-pass wave filter of the type illustrated in schematic diagram form in Fig. 2. As is well understood by those skilled in the art such a mechanical filter can be readily designed to freely pass a particular wide band of mechanical vibrational frequencies and to substantially match a predetermined characteristic mechanical impedance over the selected wide band of frequencies. As taught in the above-mentioned Mason application, this wide band of frequencies should include at least the second, third and fourth harmonics of the fundamental frequency of vertical vibration of the cable spans.

The principles upon which the design of both mechanical and electrical wave filters are based are well known to those skilled in the art and are explained in detail in a number of excellent publications, such as, for example, W. P. Mason's book entitled "Electromechanical Transducers and Wave Filters," second edition, published by D. Van Nostrand Co., Inc., 250 Fourth Avenue, New York 3, New York, 1948, and the publications to which reference is made in Mason's book.

Figure 2:
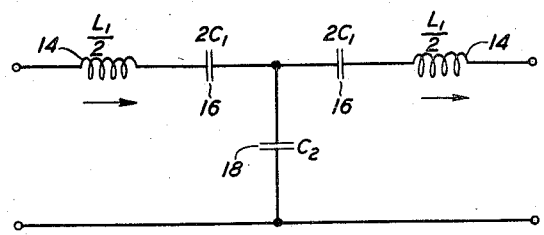
Fig. 2 is an electrical schematic diagram of an electrical band-pass wave filter analogous to mechanical filters of the general type illustrated by Fig. 1.

As explained in Mason's above-mentioned application and in his above-mentioned book, the inductances 14 of Fig. 2 of the accompanying drawings (also designated $$\frac{L_1}{2}$$

in accordance with long established filter design practice) correspond to the masses 17 of Fig. 1 of the accompanying drawings. Similarly the two capacitances 16 of Fig. 2 (also designated $2C_1$) correspond to the springs 19 and 20, respectively, of Fig. 1, and the capacitance 18 (or $C_2$) of Fig. 2 corresponds to the coupling spring 22 of Fig. 1.

The structure illustrated in Fig. 1 of the accompanying drawings is superior to that illustrated in Fig. 3 of the drawings of Mason's above-mentioned application in that a much greater degree of freedom is afforded in determining the length $l$ between the two ends of the filter structure, since in Mason's structure the characteristics of the cable determine this distance $l$. This is important since for some commonly used telephone cables, distances in the order of twenty feet would be required if the compliance of the cable were to be employed to couple the two suspended masses of the filter.

Figure 4:
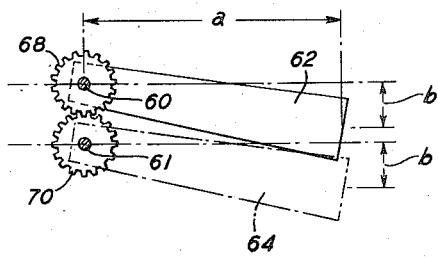
Fig. 4 is a side view of the principal elements of the filter of Fig. 3.

In Figs. 3 and 4 a type of cable-supporting, mechanical, band-pass, wave filter of the invention is illustrated which represents an improvement over a related type illustrated in Figs. 8 and 9 of the above-mentioned application of W. P. Mason.

In the arrangement illustrated in Figs. 3 and 4, the combined torsional compliance of two sections of steel rod hereinafter to be known as shafts 60 and 61, respectively, is employed to couple the arm 64, at the left end of the filter structure with the arm 62, at the right end of the structure. The right end of shaft 61 is geared to the left end of shaft 60 by the "one to one ratio" gears 68, 70. Shaft 61 is supported for free rotation about its longitudinal axis by the three bearings 56. Shaft 60 is supported for free rotation about its longitudinal axis by the three bearings 54. The bearings 54 and 56 are supported on the rigid member 52 which in turn is rigidly fastened to supporting pole 50 by lag-screws 55. Arms 62 and 64 are similar rigid arms keyed or otherwise rigidly fastened to the ends of their respective shafts 60 and 61. In the position of static equilibrium arms 62 and 64 are parallel and each has a horizontal projection $a$ and a vertical projection $b$ with respect to the longitudinal axis of their respective shafts as indicated in the partial side view of Fig. 4. The purpose of gears 68, 70 is to permit the arms 62 and 64 to extend in parallel directions and on the same side of the vertical plane of the longitudinal axes of shafts 60, 61, while retaining the property that a downward motion of one arm tends to produce an upward motion of the other arm and vice versa so that the weight of the cable span to the left of arm 64 is balanced by the weight of the similar cable span to the right of arm 62. Suitable clamping means 57 are provided at the ends of each of the arms 62, 64, to support the cable spans. Thus, the structure illustrated in Figs. 3 and 4 is clearly a cable-supporting, mechanical, band-pass filter structure, closely related not only to the structure illustrated in Figs. 8 and 9 of the above-mentioned application of W. P. Mason but also to that illustrated in Figs. 4 and 5 of the Mason application. The total effective length of the two shafts 60 and 61 of the structure of Figs. 3 and 4 of the present application and the projections $a$, $b$ of Fig. 4 can be substantially the same as the length of the single shaft 60 and the projections $a$, $b$, respectively, as given for Figs. 4 and 5 of Mason's above-mentioned application. In a typical case the combined lengths of shafts 60 and 61 acting as the torsional compliance between arms 62 and 64 was four feet, and the arms 62 and 64 each had horizontal projections $a$ of 2 feet and vertical projections $b$ of 0.4 foot, respectively.

The structure illustrated in Figs. 3 and 4 of the present application is preferable to that illustrated in Figs. 8 and 9 of the Mason application in that it eliminates the necessity of employing the counterweights 170 of the latter structure.

Figure 5:
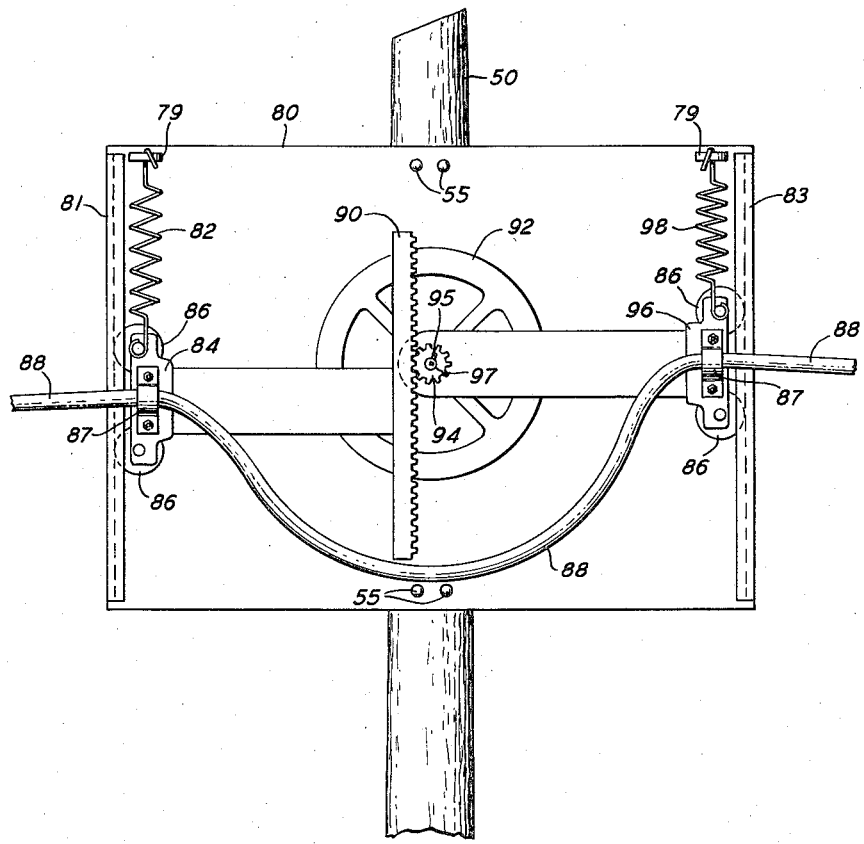
Fig. 5 is a further form of cable supporting, mechanical, band-pass, wave filter of the invention employing inertia rather than compliance to couple its "input" and "output" ends.

The structure illustrated in Figs. 3 and 4 of the present application is preferable to that illustrated in Figs. 4 and 5 of the Mason application in that it eliminates the substantial torque about a vertical axis present when the latter structure is employed.

In Fig. 5 of the accompanying drawings a cable-supporting, mechanical, band-pass, wave filter structure of the invention is illustrated which is quite similar to that illustarted in Fig. 1 of the accompanying drawings. It differs therefrom principally in that the coupling between the two carriages or masses 84 and 96 is effected by the inertia of a fly-wheel 92 instead of by a spring or compliance such as spring 22 of Fig. 1.

In the structure of Fig. 5, brackets 79 on rigid member 80 support like springs 82 and 98. These springs, in turn, support carriages 84 and 96, respectively, along the left and right vertical sides, 81, 83, of the rigid mounting member 80. Member 80 is firmly attached to supporting pole 50 by lag-screws 55. Each of the carriages, 84 and 96 is equipped with wheels 86 and clamping means 87 which latter firmly hold the ends of the spans of cable 88 to the left and right, respectively, of the structure 80. The vertical sides, 81, 83, of structure 80 thus serve to sustain the tensions of the cable spans substantially as described for the corresponding portions of structure 10 of Fig. 1.

The carriage 84 includes at its right side a vertical rack 90 which engages a small pinion gear 94. Pinion gear 94 is keyed to shaft 97 by key 95. Shaft 97 is carried in a bearing included in the carriage 96, and can freely rotate in said bearing. A flywheel 92 is mounted on the other (rear) end of shaft 97 and is keyed, or otherwise firmly attached, to rotate with the shaft.

The portion of cable 88 between clamps 87 is arranged to form a substantially tensionless loop and affects the filter action of the cable supporting arrangement only in that it contributes substantially half of its weight to each of the carriages, 84 and 96, respectively.

Obviously, the coupling between the members 84 and 96 is by means of the inertia of the flywheel 92, but otherwise the over-all arrangement of Fig. 5 is closely similar to that of Fig. 1.

Figure 6:
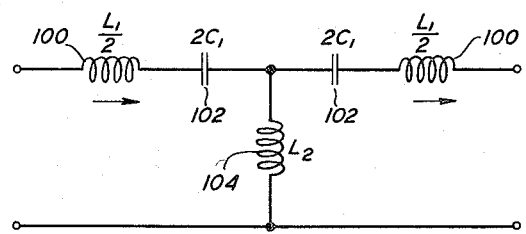
Fig. 6 is an electrical schematic diagram of an electrical band-pass wave filter analogous to mechanical filters of the general type illustrated by Fig. 5.

In Fig. 6 an electrical schematic diagram of an analogous electrical band-pass wave filter is illustrated for the structure of Fig. 5. From inspection it is apparent that it differs from the schematic diagram of Fig. 2 only in that the shunt condenser 18 (or $C_2$) of Fig. 2 is replaced by a shunt inductance 104 (or $L_2$) of Fig. 6. Inductances 100 and capacitances 102 correspond of course to masses 84, 96 and springs 82, 98 of the structure of Fig. 5, respectively. Conventional filter design methods are, of course, available, as described for example in W. P. Mason's above-mentioned application and book, by means of which the appropriate value of mass for each of the carriages 84 and 96, the effective inertia of the arrangement including flywheel 92, and the compliance of each of the springs 82 and 98 can be proportioned to provide the requisite pass-band of vibrational frequencies and a substantially matching characteristic mechanical impedance over the said pass-band.

The mechanical, band-pass wave filter arrangement of Fig. 5 has the advantage that a wide range of values of the effective coupling between the masses or carriages 84 and 96 is readily obtained by substituting wheels of differing weights and/or radii for the flywheel 92 of Fig. 5. Alternatively, the rim of flywheel 92 can be readily weighted by a plurality of detachable small weights symmetrically arranged to preserve its rotational balance while increasing its inertia by any desired amount with a wide range of values.

Numerous and varied other forms of structures embodying the principles and within the spirit and scope of the present invention will readily occur to those skilled in the art. It is, of course, obvious, for example, that any of the mechanical wave filter structures of the present invention can be "terminated" by a matching mechanical impedance of the "dash-pot" or "Prony-brake" type, or the like, in the manner illustrated by Figs. 6 and 7 of Mason's above-mentioned application and described in detail in said application.

What is claimed is:

1. A cable supporting means for successive spans of an aerial cable system, said means comprising a mechanical band-pass wave filter which includes a torsional compliance consisting of two horizontal shafts supported for rotation about their respective longitudinal axes, one end of a first of said shafts being connected to one end of a second of said shafts by a pair of gears having a gear ratio of unity, a first rigid arm rigidly connected to the other end of said first shaft and a second rigid arm rigidly connected to the other end of said second shaft, the longitudinal axes of said arms each being at an angle of substantially 90 degrees with respect to the longitudinal axis of the shaft to which it is attached, the longitudinal axes of said arms being parallel and at an acute angle with respect to horizontal such that the free end of each arm is a predetermined distance below the horizontal plane including the longitudinal axis of its associated shaft, said distance being a fractional part of the length of said arm, the inertias of said arms, the gravitational restoring forces on said arms and the torsional compliance of said pair of shafts being proportioned to constitute a mechanical band-pass wave filter freely passing several low harmonics of the fundamental frequency of vertical vibration of the cable spans to be supported, said filter having a characteristic impedance throughout its pass-band of frequencies substantially matching the characteristic impedance of the cable spans to be supported.

2. A mechanical band-pass wave filter which comprises a torsional compliance consisting of two parallel shafts, supporting means by which said shafts are supported to rotate freely about their respective longitudinal axes rigid supporting means holding said first mentioned supporting means to maintain the longitudinal axes of said shafts in parallel horizontal planes, one end of a first one of said shafts being coupled to one end of a second one of said shafts by a pair of gears whereby a clockwise torque applied to the other end of one of said shafts will be converted to a counterclockwise torque at the other end of the other of said shafts, a first substantially rigid arm having a predetermined mass, said first arm being rigidly attached to the free end of a first of said shafts, a second substantially rigid arm having a predetermined mass, said second arm being rigidly attached to the free end of the second of said shafts, the longitudinal axes of said arms being substantially normal to the longitudinal axes of their respective shafts, the longitudinal axes of said two arms being substantially parallel and being depressed at a small acute angle with respect to horizontal, the masses and compliances of said shafts and said arms being proportioned to constitute a mechanical wave filter having a predetermined characteristic impedance and freely passing a substantial band of frequencies of vibratory energy applied at the end of one of said arms to the end of the other of said arms.

References Cited in the file of this patent

UNITED STATES PATENTS

| | | |
|---|---|---|
| 1,465,024 | Regenbogen et al. | Aug. 14, 1923 |
| 1,522,068 | Morgan | Jan. 6, 1925 |
| 1,666,681 | Burgess | Apr. 17, 1928 |
| 2,667,621 | Burns et al. | Jan. 26, 1954 |
| 2,675,985 | Boiteux | Apr. 20, 1954 |

FOREIGN PATENTS

| | | |
|---|---|---|
| 467,126 | Germany | Oct. 20, 1928 |